April 4, 1950     Y. K. ARASE     2,502,500
TWO-WAY NOZZLE
Filed Dec. 6, 1946     2 Sheets-Sheet 1
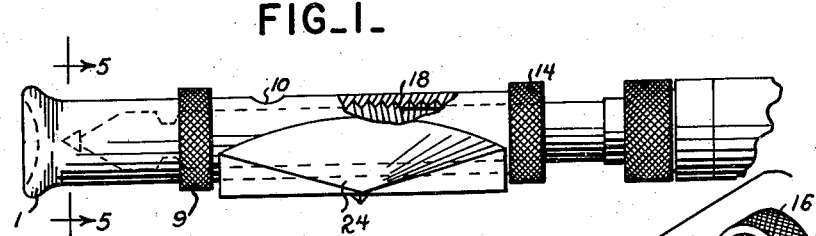
FIG_1_
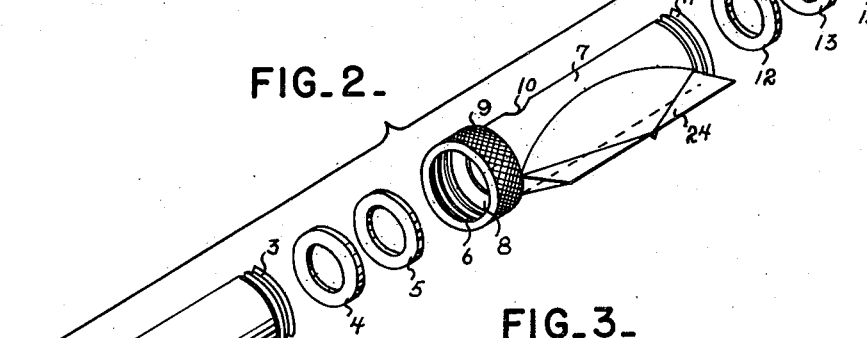
FIG_2_
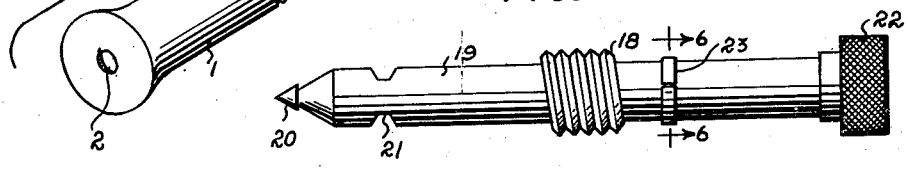
FIG_3_
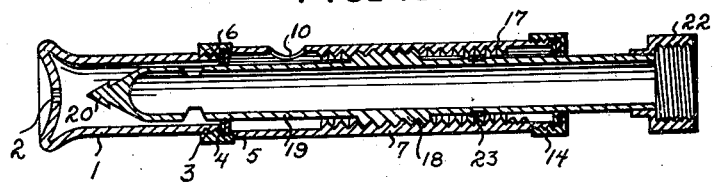
FIG_4_
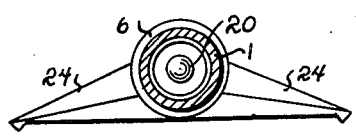
FIG_5_
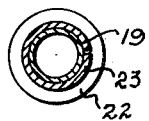
FIG_6_
INVENTOR.
YURIKO K. ARASE
BY *Victor J. Evans & Co.*
ATTORNEYS

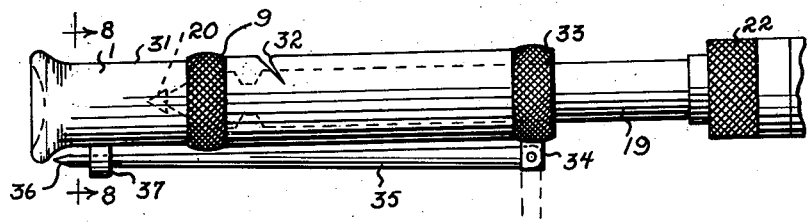
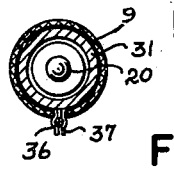
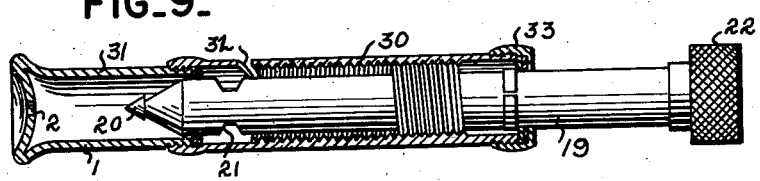
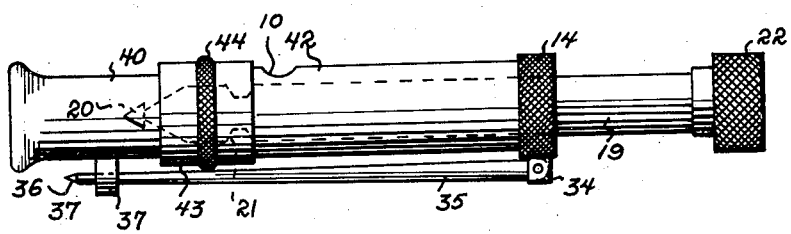
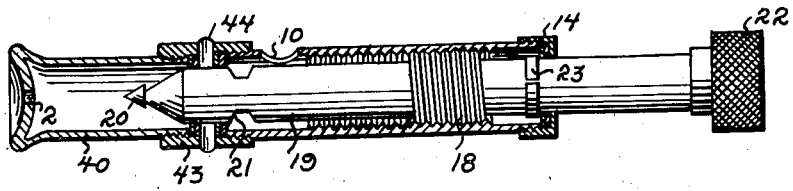

Patented Apr. 4, 1950

2,502,500

UNITED STATES PATENT OFFICE 2,502,500

TWO-WAY NOZZLE

Yuriko K. Arase, Minneapolis, Minn.

Application December 6, 1946, Serial No. 714,405

2 Claims. (Cl. 299—146)

This invention relates to improvements in devices for sprinkling lawns and the like, and more particularly to the provision of a combination device which enables sprinkling by hand manipulation or by placing the device on the ground.

It is an object of the invention to provide a device which eliminates the necessity of a detachable leg for supporting a hose when the device is used on the ground.

A further object is to provide a device which can be readily changed from a ground sprinkler to a hand sprinkler. As a ground sprinkler, the device is capable of producing the various types of sprinkling which heretofore have been performed by hand. It can sprinkle a certain spot or a broad or narrow patch with a gentle spray or a spray of brisk strength; and the device is provided with a support which enables spraying at various angles.

These and other objects are attained by the novel construction and arrangement of parts hereinafter described and illustrated by the accompanying drawings, forming a part hereof, and in which:

Fig. 1 is a side view of a sprinkler embodying the invention.

Fig. 2 is an exploded view of the sprinkler.

Fig. 3 is a side view of a nozzle used in the sprinkler.

Fig. 4 is a sectional view of the sprinkler shown in Fig. 1.

Fig. 5 is a sectional view taken on the line 5—5 of Fig. 1.

Fig. 6 is a sectional view taken on the line 6—6 of Fig. 3.

Fig. 7 is a side view of a slightly modified form of the invention.

Fig. 8 is a sectional view taken on the line 8—8 of Fig. 7.

Fig. 9 is a longitudinal sectional view showing a nozzle in a retracted position.

Fig. 10 is a side view of a further modification.

Fig. 11 is a longitudinal sectional view of the form shown in Fig. 10.

Referring to the drawings, in Figs. 1 and 2, the sprinkler is shown to include an outer shell comprising a tubular neck 1 having an opening 2 to receive the point of a nozzle. The neck 1 has a male thread 3 adapted to abut a metal ring 4, engageable with a watertight packing 5, made of rubber or other suitable material. The male thread 3 is adapted to engage the female thread 6 of a tubular member or sleeve 7, which has a rim 8 against which the packing 5 rests when the male and female threads are in engagement. The tube 7 is knurled at 9 to facilitate rotation thereof; and the tube 7 has an opening 10 for the passage of water for gentle spraying purposes.

The tube 7 has a male thread 11 engageable with a metal ring 12, which in turn engages watertight packing 13 adapted to rest on rim 16 when the female threads 15 of a knurled cap 14 engage the male threads 11.

The tubular member 7 is internally threaded at 17 and adapted to engage the threads 18 on a nozzle or valve member 19, which has a pointed end 20 adapted to enter the hole 2 to stop the flow of water. The nozzle has cut out portions or holes 21 which enable the free passage of water to the opening 10 in member 7, the nozzle 19 being hollow and provided with a knurled joint 22 having female threads adapted to engage the male threads of a common type of hose connection. Positioned in a slot in the outer surface of the nozzle is a stop band 23 which is adapted to expand and frictionally bears against the inner surface of tube 7 to prevent accidental rotation of the nozzle. The band 23 also abuts the cap 14 when the nozzle is retracted to prevent removal of the nozzle from the member 7.

Extending from each side of member 7 are weights 24 which are arranged to hold the sprinkler in a stable position while resting on the ground.

In the form of the device shown in Figs. 7, 8, 9, a tubular member 30 is connected to a neck 31 as described in connection with Figs. 1 and 2, the member being provided with an inclined opening 32 for spraying from the middle of the nozzle. A cap 33 has depending therefrom an ear 34 to which is pivotally connected a leg 35 having a pointed end 36, the leg being arranged to be supported, when not in use, by a catch 37 on the neck 31. When in use the leg is moved down about the pivot 34 and stuck into the ground.

As shown in Figs. 10 and 11 the neck and tubular member here designated 40 and 42, respectively, have male threads adapted to engage female threads on knurled coupling 43. Otherwise, the structure of the sprinkler is similar to that described above.

In operation, the nozzle is moved back and forth in the tubular member to open or close the sprinkler. When retracted, water is allowed to pass through openings such as shown at 10 or 32. When so desired, the sprinkler can be used for hand sprinkling or for sprinkling from the ground without requiring the attaching of separate legs and the like.

The above description is to be considered as illustrative and not limitative of the invention of which modifications can be made without departing from the spirit and scope of the invention as set forth in the appended claims.

The invention having been described, what is claimed is:

1. In a sprinkling device, a tubular shell provided with an outlet opening in one end thereof, a tubular cylindrical sleeve connected to the other end of said shell, there being an opening in said sleeve intermediate the ends thereof for the egress therethrough of fluid, an elongated hollow valve member movably mounted within said sleeve and having a pointed end mounted for movement into and out of engagement with the opening in said shell, the other end of said valve member adapted to be connected to a source of fluid, said valve member being provided with holes for the egress therethrough of fluid, sealing means embodying a water-tight packing ring arranged between the outlet opening in said shell and the opening in said sleeve, said sleeve being provided with an interiorly-threaded portion, said valve member having an exteriorly-threaded portion arranged in engagement with the interiorly-threaded portion of said sleeve, a stop band circumposed on said valve member for limiting movement of said valve member out of said sleeve, a knurled cap arranged on an end of said sleeve and adapted to be used for manually rotating said sleeve.

2. In a sprinkling device, a tubular shell provided with an outlet opening in one end thereof, a tubular cylindrical sleeve connected to the other end of said shell, there being an opening in said sleeve intermediate the ends thereof for the egress therethrough of fluid, an elongated hollow valve member movably mounted within said sleeve and having a pointed end mounted for movement into and out of engagement with the opening in said shell, the other end of said valve member adapted to be connected to a source of fluid, said valve member being provided with holes for the egress therethrough of fluid, sealing means embodying a water-tight packing ring arranged between the outlet opening in said shell and the opening in said sleeve, said sleeve being provided with an interiorly-threaded portion, said valve member having an exteriorly-threaded portion arranged in engagement with the interiorly-threaded portion of said sleeve, a stop band circumposed on said valve member for limiting movement of said valve member out of said sleeve, a knurled cap arranged on an end of said sleeve and adapted to be used for manually rotating said sleeve, and means for maintaining said sprinkling device immobile when resting on the ground.

YURIKO K. ARASE.

REFERENCES CITED

The following references are of record in the file of this patent:

UNITED STATES PATENTS

| Number | Name | Date |
|---|---|---|
| 538,727 | Byler | May 7, 1895 |
| 623,057 | Wentz | Apr. 11, 1899 |
| 742,133 | Sherman | Oct. 20, 1903 |
| 898,759 | Melavin | Sept. 15, 1908 |
| 981,956 | Tregoning | Jan. 17, 1911 |
| 1,026,742 | French | May 21, 1912 |
| 1,031,176 | Gilpin | July 2, 1912 |
| 1,838,438 | Nichols | Dec. 29, 1931 |
| 1,922,519 | Armstrong | Aug. 15, 1933 |

FOREIGN PATENTS

| Number | Country | Date |
|---|---|---|
| 18,839 | Great Britain | July 29, 1915 |
| 590,616 | Germany | Jan. 6, 1934 |